United States Patent
Tanaka

(10) Patent No.: US 10,710,583 B2
(45) Date of Patent: Jul. 14, 2020

(54) VEHICLE CONTROL APPARATUS

(71) Applicant: DENSO CORPORATION, Kariya, Aichi-pref. (JP)

(72) Inventor: Hiromichi Tanaka, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 140 days.

(21) Appl. No.: 16/110,653

(22) Filed: Aug. 23, 2018

(65) Prior Publication Data

US 2019/0061753 A1    Feb. 28, 2019

(30) Foreign Application Priority Data

Aug. 25, 2017  (JP) ................................. 2017-161927

(51) Int. Cl.
*B60W 30/12*    (2020.01)
*B60W 50/14*    (2020.01)
(Continued)

(52) U.S. Cl.
CPC .............. *B60W 30/12* (2013.01); *B60Q 9/00* (2013.01); *B60W 50/0098* (2013.01);
(Continued)

(58) Field of Classification Search
CPC ........... B60W 30/12; B60W 2050/146; B60W 2050/143; B60W 50/16; B60W 50/0098; B60W 50/14; B60W 2552/30; G06K 9/2054; G06K 9/00798; G01C 21/32; G01C 21/30; G01S 19/13; G01S 19/50; B62D 15/025; B62D 15/029; B60Q 9/00
See application file for complete search history.

(56) References Cited

U.S. PATENT DOCUMENTS

| | | | |
|---|---|---|---|
| 5,555,312 A * | 9/1996 | Shima ....................... | B60R 1/00 340/937 |
| 8,180,110 B2 * | 5/2012 | Kageyama ......... | G06K 9/00798 348/148 |
| 2006/0217860 A1 | 9/2006 | Ihara | |
| 2006/0217861 A1 | 9/2006 | Ihara et al. | |
| 2006/0233424 A1 * | 10/2006 | Miyajima ............... | G06T 17/05 382/104 |

(Continued)

FOREIGN PATENT DOCUMENTS

JP    H09-304083 A    11/1997
JP    2003-168198 A    6/2003
(Continued)

*Primary Examiner* — Qian Yang
(74) *Attorney, Agent, or Firm* — Maschoff Brennan

(57) ABSTRACT

A vehicle control apparatus configured to perform driving aid control using map information stored in a storage, where the map information includes attribute information concerning roads on which a vehicle carrying the apparatus may travel and widths of the respective roads. In the vehicle control apparatus, a road recognizer is configured to recognize a travelled road that is a road on which the own vehicle is traveling. An information acquirer is configured to acquire the attribute information of the travelled road. An image acquirer is configured to acquire an image captured by the imager. A search range setter is configured to, using the attribute information acquired by the information acquirer, set a search range in the captured image for searching for a road border that is an edge or a demarcation line of the travelled road. A border recognizer is configured to recognize the road border in the search range.

12 Claims, 4 Drawing Sheets

(51) Int. Cl.
*B60W 50/00* (2006.01)
*B60Q 9/00* (2006.01)
*G06K 9/00* (2006.01)
*B62D 15/02* (2006.01)
*G01S 19/13* (2010.01)
*G01C 21/30* (2006.01)
*G06K 9/20* (2006.01)
*B60W 50/16* (2020.01)
*G01S 19/50* (2010.01)

(52) U.S. Cl.
CPC .......... *B60W 50/14* (2013.01); *B62D 15/029* (2013.01); *G01C 21/30* (2013.01); *G01S 19/13* (2013.01); *G06K 9/00798* (2013.01); *G06K 9/2054* (2013.01); *B60W 50/16* (2013.01); *B60W 2050/143* (2013.01); *B60W 2050/146* (2013.01); *B60W 2552/30* (2020.02); *B62D 15/025* (2013.01); *G01S 19/50* (2013.01)

(56) References Cited

U.S. PATENT DOCUMENTS

| | | | |
|---|---|---|---|
| 2006/0239509 A1* | 10/2006 | Saito | G06K 9/00798 382/104 |
| 2009/0174577 A1* | 7/2009 | Nakamura | G06K 9/00798 340/995.1 |
| 2018/0197021 A1* | 7/2018 | Lee | G06T 7/11 |
| 2019/0042860 A1* | 2/2019 | Lee | G06T 3/4053 |

FOREIGN PATENT DOCUMENTS

| | | | |
|---|---|---|---|
| JP | 2005-4442 | * | 1/2005 |
| JP | 2005-83758 | * | 3/2005 |
| JP | 2005-202761 A | | 7/2005 |
| JP | 2006-264623 A | | 10/2006 |
| JP | 2007-288444 A | | 11/2007 |
| JP | 2007-304965 | * | 11/2007 |
| JP | 2015-68665 | * | 4/2015 |
| JP | 2016-189084 A | | 11/2016 |

* cited by examiner

VEHICLE CONTROL APPARATUS

CROSS-REFERENCE TO RELATED APPLICATION

This application is based on and claims the benefit of priority from earlier Japanese Patent Application No. 2017-161927 filed on Aug. 25, 2017, the description of which is incorporated herein by reference.

BACKGROUND

Technical Field

This disclosure relates to a vehicle control apparatus.

Related Art

Driving aids are known which acquire image data relating to forward images from an imager, such as a camera or the like, and acquiring information needed to aid vehicle driving from the image data. As an example, a driving aid technique as disclosed in Japanese Patent Application Laid-Open Publication No. 2005-202761 is configured to recognize a traffic light from the image data acquired by the imager. More specifically, this driving aid technique detects a location of the vehicle using a global positioning system (GPS) receiver or the like, and determines an area for detecting a traffic light in the image data using prestored information including a location of the traffic light around the current location of the vehicle in the image data.

For example, driving aid may include recognizing demarcation lines for demarcating lanes (e.g., lane markings) of a road, road edges and the like, and determining a travel path for a vehicle or alerting a driver of the vehicle of a deviation from a lane or a road based on information concerning the recognized demarcation lines and the like. For implementation of such driving aid, it is needed to accurately detect locations of the demarcation lines, the road edges and the like from image data acquired by the imager. However, as the demarcation lines and the like are depicted in planar fashion, false recognition may be caused by tire marks or shadows of roadside objects on a road surface.

In view of the above, it is desired to have a vehicle control apparatus that can property recognize a road border, such as a demarcation line, a road edge or the like.

SUMMARY

One aspect of the present disclosure provides a vehicle control apparatus mounted in a vehicle equipped with an imager to capture an image of surroundings of the vehicle. The vehicle control apparatus is configured to perform driving aid control using map information stored in a storage, where the map information includes attribute information concerning roads on which the vehicle carrying the apparatus may travel and widths of the respective roads. The vehicle carrying the apparatus is referred to as an own vehicle. The apparatus includes: a road recognizer configured to recognize a travelled road that is a road on which the own vehicle is traveling; an information acquirer configured to acquire the attribute information of the travelled road; an image acquirer configured to acquire an image captured by the imager; a search range setter configured to, using the attribute information acquired by the information acquirer, set a search range in the captured image for searching for a road border that is an edge or a demarcation line of the travelled road; and a border recognizer configured to recognize the road border in the search range.

Borders of the travelled road, searched for and recognized in the image captured by the imager, are used to perform driving aid control. If a search is conducted over the entire area of the captured image, border recognition may be susceptible to tire marks or the like on the road, which may increase the likelihood of false recognition. In light of the above, in the above configuration, a limited search range for a road border is set using the attribute information concerning a width of the road. Use of such limited search range may decrease the likelihood of false recognition of a road border in the captured image.

DESCRIPTION OF SPECIFIC EMBODIMENTS

Figure 1:
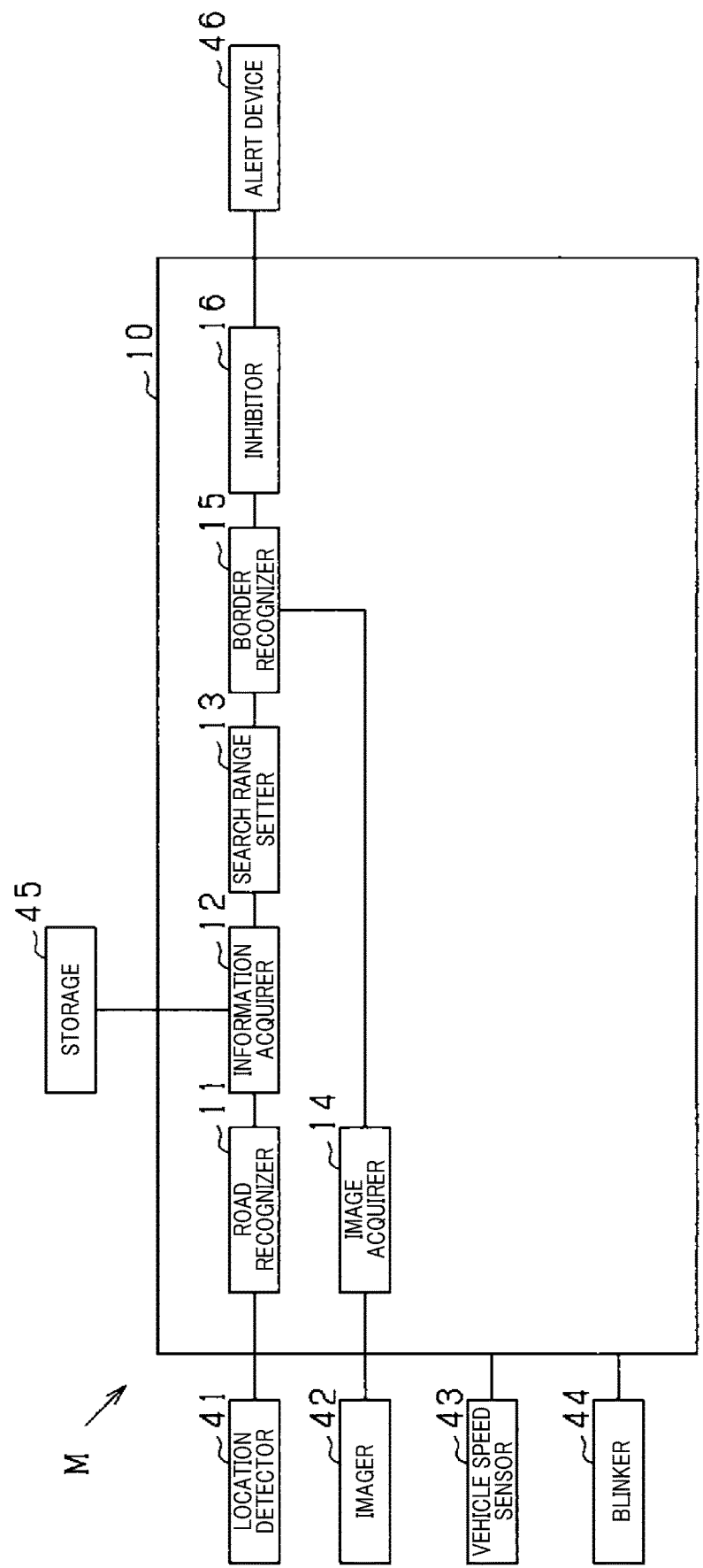
FIG. 1 is a block diagram of a vehicle control apparatus in accordance with one embodiment of the present disclosure.

Hereinafter, exemplary embodiments of the present disclosure will be described in detail with reference to the accompanying drawings, in which like reference numerals refer to like or similar elements and duplicated description thereof will be omitted.

A vehicle control apparatus of the present embodiment is mounted in a vehicle. The vehicle carrying the vehicle control apparatus is hereinafter referred to as an own vehicle. The vehicle control apparatus is configured to perform vehicle control to inhibit the own vehicle from crossing a road border. Elements connected to the vehicle control apparatus 10 and a schematic configuration of the vehicle control apparatus 10 will now be described with reference to FIG. 1.

A location detector 41 is connected to the vehicle control apparatus 10. The location detector 41 includes a global navigation satellite system (GNSS) receiver and on-board sensors for detecting relative movement of the own vehicle M to detect a location of the own vehicle M. More specifically, the GNSS receiver is configured to detect a location, a speed, and a heading direction of the own vehicle M based on satellite signals received from a plurality of global positioning system (GPS) satellites and signals received from a ground reference station. The on-board sensors for detecting relative movement of the own vehicle M include a sensor, such as a gyro sensor or an acceleration sensor, to detect a rotation angle and an acceleration around each of three orthogonal axes with the own vehicle M being at a center of the three axes, a yaw rate sensor, and a vehicle speed sensor 43.

The own vehicle M includes an imager 42 to capture an image of surroundings of the own vehicle M. The imager 42 is an on-board camera, such as a charge-coupled device (CCD) camera, a complementary metal-oxide semiconductor (CMOS) image sensor, a near-infrared camera or the like. The imager 42 is disposed near a vehicle-widthwise center of an upper edge of a windshield of the own vehicle M to capture, from an overhead perspective, an image of a front area that horizontally spans a pre-defined range of angles from an imaging axis of the camera, and sequentially output the captured image to the vehicle control apparatus 10.

The vehicle speed sensor 43 is configured to detect a speed of the own vehicle M. The vehicle speed sensor 43 may be provided for a wheel of the own vehicle M or a drive shaft that rotates together with the wheel of the own vehicle M and detect a rotational speed of the wheel. The vehicle speed sensor 43 outputs the detected rotational speed of the wheel or the speed of the own vehicle M calculated based on the rotational speed of the wheel to the vehicle control apparatus 10.

A blinker 44, as a direction indicator, is configured to output to the vehicle control apparatus 10 a signal indicative of in which one of a right-turn indicating position, a left-turn indicating position, and the non-active position the blinker 44 has been placed by a driver's maneuver.

A storage 45 includes a non-volatile storage media storing map information, such as a hard disk, an optical drive, or a semiconductor memory. The map information includes attribute information for each road. More specifically, the attribute information for each road includes positional coordinates (i.e., a coordinate point) of the road, a width of the road, the number of lanes of the road, a width of each lane of the road, the presence or absence of a central reservation, the presence or absence of a sidewalk. For a road with a central reservation, which is a grassy or paved area that divides the road such that traffic going in one direction is kept separate from traffic going in the opposite direction, the number of lanes refers to the number of lanes of each one of roadways separated by the central reservation. For a road without a central reservation, the number of lanes refers to the total number of lanes of the road.

An alert device 46 may include an on-board speaker, an on-board display, and a vibrator for vibrating a steering wheel or the like, to output an audible alarm or a visual alert indication or vibrate the steering wheel.

The vehicle control apparatus 10 may be configured as a microcomputer including a central processing unit (CPU), a memory as a collection of a read-only memory (ROM), a random-access memory (RAM) and the like, and an input/output interface (I/O). The vehicle control apparatus 10 includes, as functional blocks, a road recognizer 11, an information acquirer 12, a search range setter 13, an image acquirer 14, a border recognizer 15, and an inhibitor 16. Functions of these blocks, as described later in detail, may be implemented by the CPU executing computer programs stored in the ROM or the like.

The road recognizer 11 is configured to recognize one of roads registered in the map information, on which the own vehicle M is traveling, as a travelled road. For example, based on the latitude, longitude, and altitude, i.e., a vehicle location P, of the own vehicle M detected based on a detection result of the location detector 41, the road recognizer 11 determines the road on which the own vehicle M is traveling.

The information acquirer 12 is configured to acquire the attribute information from the map information stored in the storage 45.

The search range setter 13 is configured to set a range of search (or a search range) for a road border that is an edge or a demarcation line of a road. More specifically, based on the attribute information acquired by the information acquirer 12, the search range setter 13 sets a search range for a road border. Demarcation lines include a road center line, a road lane border line, a roadway border line, a shoulder marking, as well as a white solid or dotted line painting, a yellow solid or dotted line painting, or linearly arranged stones or grass.

The image acquirer 14 is configured to acquire an image captured by the imager 42. The border recognizer 15 is configured to recognize, within the search range set by the search range setter 13, a road border in the captured image acquired by the image acquirer 14.

The inhibitor 16 is configured to, based on the vehicle location P (see FIG. 3) detected from the detection result of the location detector 41 and information acquired from the vehicle speed sensor 43, the steering sensor or the like, estimate a predicted route forward of the own vehicle M. The inhibitor 16 is further configured to, if the own vehicle M is about to cross a road border during travel along the predicted route, causes the alert device 46 to output an alert, thereby inhibiting the own vehicle M from crossing the road border.

Figure 2:
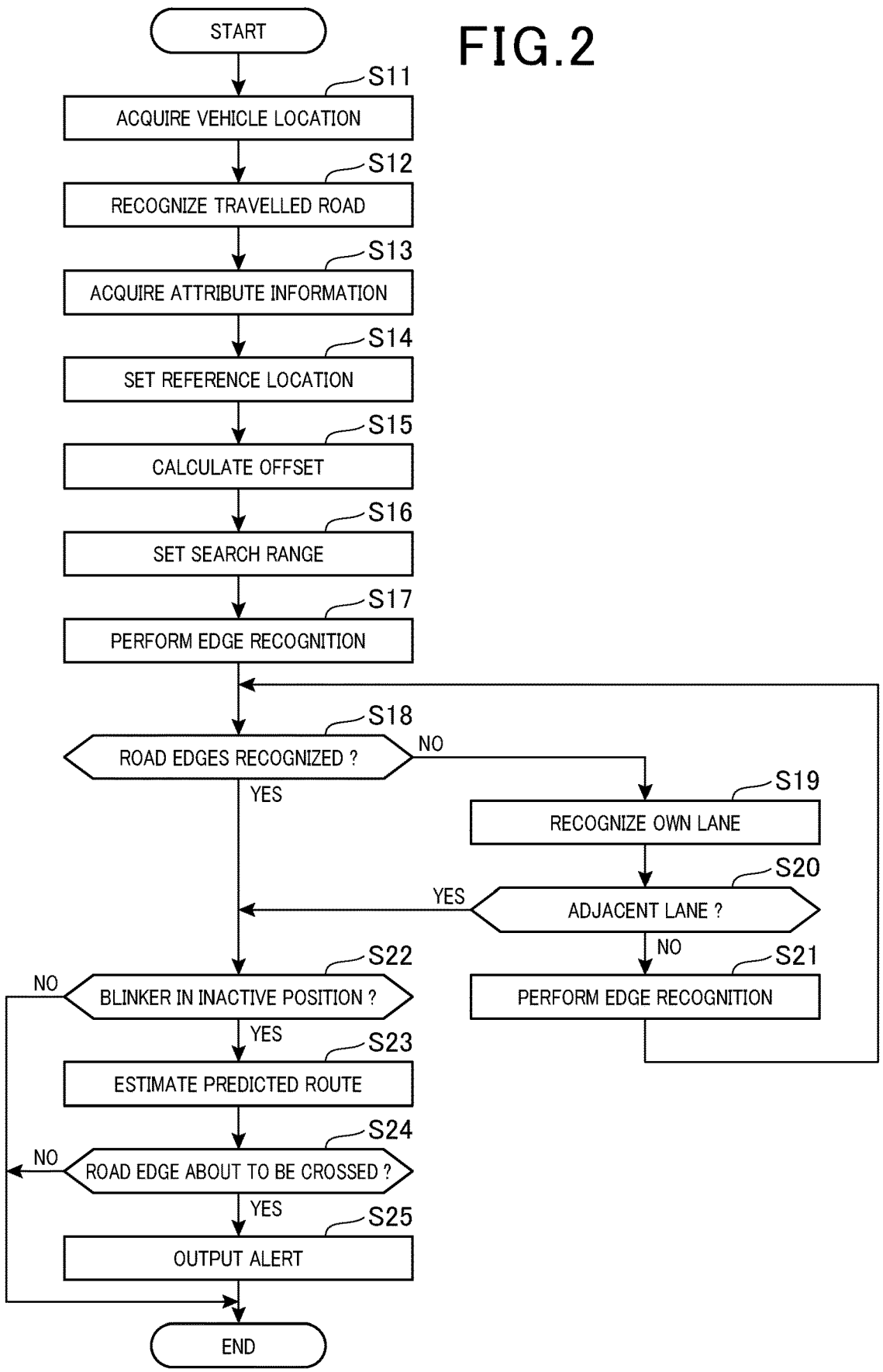
FIG. 2 is a flowchart of processing performed by the vehicle control apparatus.

Processing performed by the vehicle control apparatus 10 will now be described with reference to FIG. 2. More specifically, FIG. 2 illustrates a flowchart of processing for searching for and recognizing an edge of the road (referred to as a road edge) as a border of the road (referred to as a road border) and outputting an alert if the own vehicle M is about to cross the road border, that is, if the own vehicle M is about to deviate or depart from the road. The processing shown in the flowchart of FIG. 2 is performed iteratively every predetermined time.

At step S11, the location detector 41 detects a vehicle location P (latitude, longitude, altitude) of the own vehicle M. More specifically, the location detector 41 uses the satellite navigation for determining an absolute location of the own vehicle M based on signals received by the GNSS receiver together with the autonomous navigation for determining a location of the own vehicle M using the on-board sensors, to thereby accurately detect a vehicle location P of the own vehicle M. The vehicle location P, which is a location of the center of the own vehicle M, corresponds to a location of the imager 42 in the road width direction. At step S12, the road recognizer 11 matches a detection result acquired at step S11 with roads stored in the storage 45 to recognize the road on which the own vehicle M is traveling as a travelled road.

At step S13, the information acquirer 12 acquires attribute information stored in storage 45 based on the travelled road determined at step S12. More specifically, the information acquirer 12 acquires information indicative of location coordinates of the travelled road, the presence or absence of a central reservation, a width of the travelled road, the number of lanes of the travelled road, a width of each lane of the travelled road, the presence or absence of a sidewalk, and the like.

Figure 3:
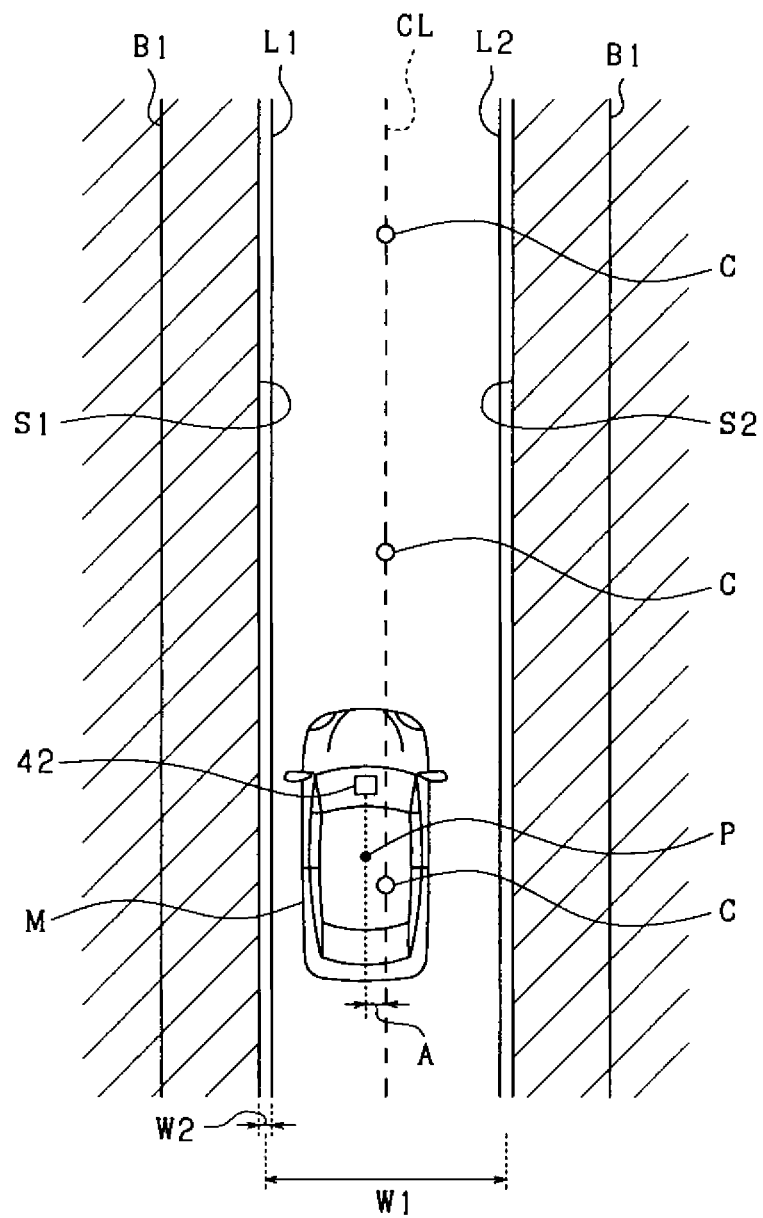
FIG. 3 is an example where an own vehicle is traveling in a one-lane road.
Figure 4:
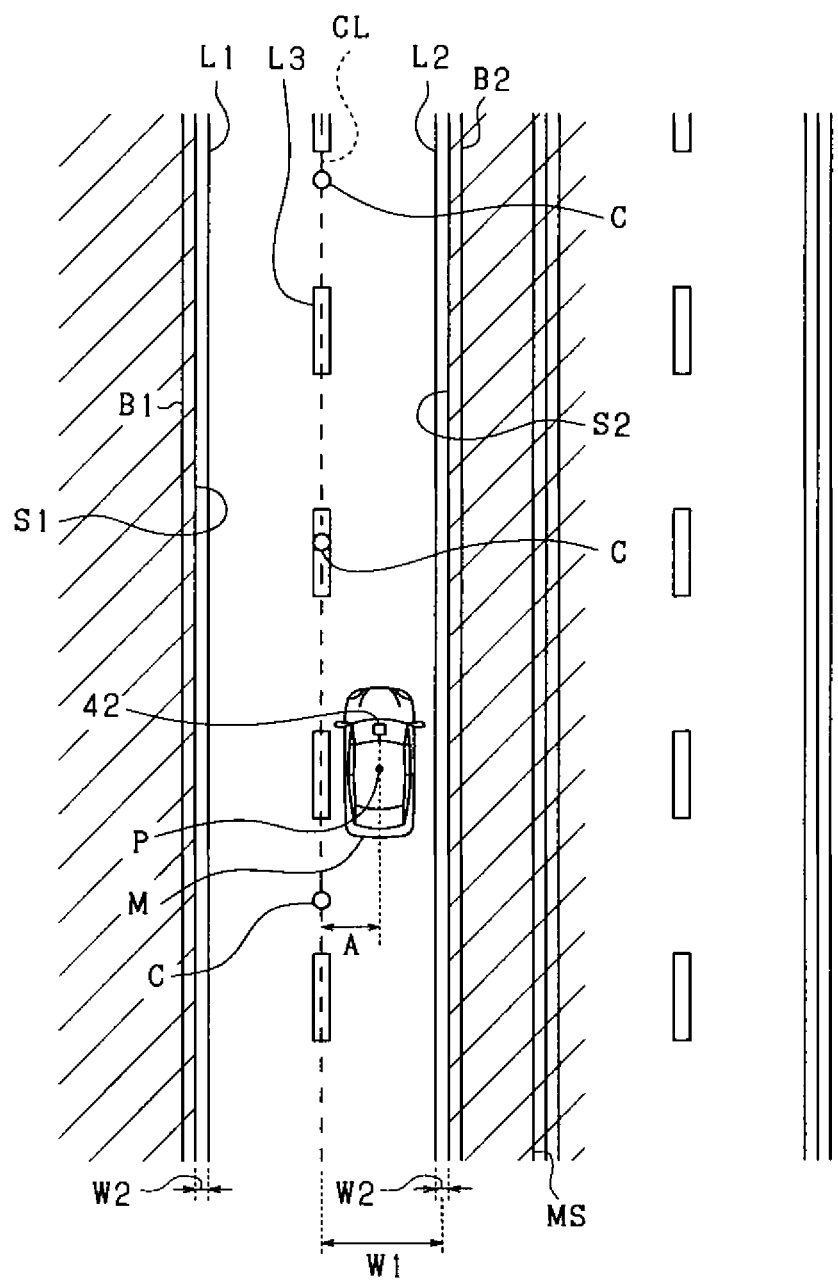
FIG. 4 is an example where an own vehicle is traveling on a road with a central reservation.

At step S14, the search range setter 13 sets a reference location. More specifically, the search range setter 13 acquires from the attribute information acquired at step S13 the location coordinates of coordinate points C of the travelled road as coordinate data applied along the travelled road. As shown in FIGS. 3 and 4, the search range setter 13 connects the coordinate points C to generate a road shape line CL. The coordinate points C are recorded in the attribute information as intersection points with other roads, shape change points, and spaced measurement points. For a road with a central reservation, each coordinate point C is located at the center of a sum of widths of the same direction lanes of the road. The road shape line CL connecting the coordinate points C is therefore a center line of one of two roadways separated by the central reservation. For a road without a central reservation, each coordinate point C is located at the center of a sum of widths of the same direction lanes and widths of the opposite direction lanes. The road shape line CL connecting the coordinate points C is therefore a center line of a roadway. The term "roadway" as used herein is only a portion of a road intended for normal vehicular traffic.

At step S15, the search range setter 13 calculates an offset A of the own vehicle M from the road shape line CL in the road width direction. More specifically, the search range setter 13 calculates a distance between the vehicle location P of the own vehicle M acquired at step S11 and the road shape line CL in the road width direction, as the offset A. If the vehicle location P of the own vehicle M is located right of the roadway shape line CL, the offset A takes a negative value. If the vehicle location P of the own vehicle M is located left of the road shape line CL, the offset A takes a positive value.

As shown in FIGS. 3 and 4, at step S16, the search range setter 13 sets search ranges S1, S2 on the left and right sides of the own vehicle M to search for road edges of both sides of the road in the road width direction as road borders. The search range setter 13 sets search ranges S1, S2 that are part of the imaging field S of the imager 42, where the search range S1 is set outward from the outer edge of the demarcation line L1 in the road width direction and the search range S2 is set outward from the outer edge of the demarcation line L2 in the road width direction. More specifically, the search range setter 13 calculates the search ranges S1, S2 using a lane width W1, that is, a distance between the center of the left demarcation line and the center of the right demarcation line of each lane, acquired from the attribute information, a width W2 of each demarcation line, and the offset A. To set the search range S1 on the left side of the own vehicle M, the search range setter 13 calculates a distance from the vehicle location P to the outer edge of the left demarcation line L1, which is given by the width W1 times the number of lanes N over two minus the offset A plus the width W2 of one demarcation line over two, and set the search range S1 on the left side of the own vehicle M to a range of distance equal to or greater than the calculated distance (that is, the left search range S1≥W1×N/2−A+W2/2). Thus, the left search range S1 is set on the left side of the left demarcation line L1. Similarly, to set the search range S2 on the right side of the own vehicle M, the search range setter 13 calculates a distance from the vehicle location P to the outer edge of the right demarcation line L2, which is given by −1 times the width W1 times the number of lanes N over two minus the offset A minus the width W2 of one demarcation line over two, and set the search range S2 on the right side of the own vehicle M to a range of distance equal to or less than the calculated distance (that is, the right search range S2≤−W1×N/2−A−W2/2). Thus, the right search range S2 is set on the right side of the right demarcation line L2.

At step S17, in the case of a one-lane road as shown in FIG. 3, the border recognizer 15 searches for and recognizes border locations B1 between the road and the outside of the road on both sides, as road edges. The border recognizer 15 applies image processing (as search processing) to the search ranges S1, S2 of the captured image to recognize border locations B1 between the road and the outside of the road on both sides. When searching for and recognizing the border locations B1, the border recognizer 15 determines the presence or absence of sidewalks in the travelled road based on the attribute information acquired at step S13. If it is determined that there is no sidewalk in the travelled road, the border recognizer 15 searches for and recognizes border locations B1 between the road and the outside of the road on both sides, as road edges. If it is redetermined that there are sidewalks in the travelled road on both sides, the border recognizer 15 searches for and recognizes a border location B1 between each sidewalk and the roadway (e.g., a border location between a curb or the like and the roadway), as a road edge. If it is redetermined that there is a sidewalk in the travelled road only on one side, the border recognizer 15 searches for and recognizes a border location B1 between the sidewalk and the roadway as a road edge on the side where there is a sidewalk, and searches for and recognizes a border location B1 between the road and the outside of the road as a road edge on the opposite side where there is no sidewalk.

At step S17, in the case of a multi-lane road as shown FIG. 4, the border recognizer 15 determines the presence or absence of a central reservation in the travelled road based on the attribute information acquired at step S13. If there is no central reservation, the border recognizer 15 searches for and recognizes border locations B1 between the road and the outside of the road on both sides as road edges of both sides of the travelled road including opposing lanes of traffic. In the presence of sidewalks, the border recognizer 15 searches for and recognizes a border location B1 between each sidewalk and the roadway (e.g., a border location between a curb or the like and the roadway), as a road edge. In the presence of a central reservation as shown in FIG. 4, the road includes two roadways of traffic traveling in opposite directions, separated by the central reservation. The border recognizer 15 searches for and recognizes, on the side of the central reservation including the own lane that is a lane in which the own vehicle M is traveling, a border location B1 between the outside of the road and the road and a border location B2 between the central reservation and one of the two roadways including the own lane. More specifically, in the case of left-hand traffic, the border location B1 is located left of the own vehicle M and the central reservation MS is located right of the own vehicle M. Therefore, the border recognizer 15 searches for and recognizes the border location B1 in the left search range 51. Meanwhile, the border recognizer 15 searches for and recognizes the border location B2 (e.g., a border location between a curb or the like and the roadway including the own lane) in the right search range S2.

At step S18, the border recognizer 15 determines whether or not the road edges have successfully been recognized. For example, if at step S18 one of the road edges has failed to be recognized due to, for example, the presence of a vehicle traveling in an adjacent lane to the own lane, the answer is "NO" at step 18. At step S19, the border recognizer 15 recognizes the own lane that is a lane in which the own vehicle M is traveling. More specifically, based on the offset A from the road shape line CL and the width of each lane, the border recognizer 15 recognizes in which lane the own vehicle M is traveling. More specifically, depending on whether the offset A is positive or negative, the border recognizer 15 determines whether the own vehicle is located left or right of the road shape line CL. As a distance between the own vehicle and the road shape line CL is known from the offset A, the border recognizer 15 can recognize the own lane by comparing the distance and the width of each lane.

At step S20, the border recognizer 15 determines whether or not there is a lane adjacent to the own lane. More specifically, at step S20, the border recognizer 15 determines whether or not there is an adjacent lane to the own lane on the side of the road shape line CL where it is determined at step S18 that the road edge has failed to be recognized. For example, in FIG. 4, if the border location B1 between the road and the outside of the road has failed to be recognized (the "NO" branch of step S18), then the answer is "YES" at step S20 because there is a left adjacent lane to the own lane. Meanwhile, in FIG. 4, if the right border location B2 between the central reservation and the roadway including the own lane has failed to be recognized (the "NO" branch of step S18), the answer is "NO" at step S20 because there is no right adjacent lane to the own lane. If the own vehicle is traveling in the leftmost lane in the case of the left-hand traffic, the border recognizer 15 determines that there is no left adjacent lane to the own lane. Therefore, the answer is "NO" at step S20.

If the answer is "NO" at step S20, then at step S21 the border recognizer 15 attempts again to recognize a road edge on the side of the road shape line CL where it is determined at step S18 that the road edge has failed to be recognized. Thereafter, the process flow returns to step S18.

If the answer is "YES" at step S18 or S20, then at step S22 the inhibitor 16 determines whether or not the blinker 44 is in the non-active position. If the blinker 44 is in the activated position, that is, if the blinker 44 is in the right-turn indicating position or in the left-turn indicating position, then the answer is "NO" at step S22 and the process flow ends. If the blinker 44 is activated, no alert will be generated, for example, as the driver of the own vehicle M intends to enter the outside of the road. If the blinker 44 is in the non-active position, the answer is "YES" at step S22 as the driver has no intention to cross the road border.

At step S23, the inhibitor 16 estimates a predicted route forward of the own vehicle M. More specifically, the inhibitor 16 estimates a predicted route based on the location of the own vehicle M, a vehicle speed acquired from the vehicle speed sensor 43, the steering angle and the like.

At step S24, the inhibitor 16 determines whether or not the own vehicle M is likely to cross one of the recognized road edges (i.e., deviate out of the road) during travel of the own vehicle M along the predicted route estimated at step S23. If the inhibitor 16 determines that the own vehicle M is not likely to cross the recognized road edge, then the process flow ends. If the inhibitor 16 determines that the own vehicle M is likely to cross one of the recognized road edges, then at step S25 the inhibitor 16 causes the alert device 46 to output an audible alarm or a visual alert indication, thereby calling attention to the driver of the own vehicle M. Thereafter, the process flow ends.

With the above configuration, the present embodiment can provide the following advantages.

In the present embodiment, edges of the road on which the own vehicle is traveling searched for and recognized in the image captured by the imager 42 are used to inhibit lane deviation (as driving aid control). Search and recognition over the entire area of the captured image may be susceptible to tire marks or the like, which may increase the likelihood of false recognition. In addition, search and recognition over the entire area of the captured image may also increase the image processing load. In light of the above, in the present embodiment, limited search ranges S1, S2 for road edges are set using the attribute information concerning road widths. Use of such limited search ranges S1, S2 may reduce the likelihood of false recognition of road edges in the captured image.

A distance between the vehicle location P of the own vehicle M and the predetermined reference location, i.e., the road shape line CL, in the road width direction is calculated as an offset A. The search ranges S1, S2 are set taking into account the offset amount A. With this configuration, the search ranges S1, S2 can be set properly even if the vehicle location P of the own vehicle M is deviated from the roadway center in the road width direction.

More specifically, in the present embodiment, the offset A is calculated using the road shape line CL as a reference location, where the road shape line CL is generated by connecting coordinate data acquired as the attribute information, that is, the coordinate points C applied along the travelled road. In an alternative embodiment, the offset may be calculated with reference to coordinate data acquired from the attribute information.

In the present embodiment, the satellite navigation for determining an absolute location of the own vehicle M based on signals received by the GNSS receiver and the autonomous navigation for determining a location of the own vehicle M using the wheel speed sensor and the yaw rate sensor are both used to determine the vehicle location P. Use of both the satellite navigation and the autonomous navigation can increase the accuracy of determining the vehicle location P of the own vehicle M. Avoiding need for map-matching enables accurately calculating the offset A.

In the present embodiment, a road edge as a road border, that is, a border location B1 between the road and the outside of the road or a border location B2 between the central reservation and one of the two roadways including the own lane, is recognized. Deviation of the own vehicle M from the road edge may increase the likelihood of accidents or the like. Therefore, implementation of driving control needs road edge recognition. When there is no adjacent lane to the own lane, the likelihood of deviation out of the road is higher than when there is an adjacent lane to the own lane. Therefore, a significant need exists for road edge recognition. The presence of branches of trees and shadows of buildings at or around the road edge may increase the likelihood of false recognition. Particularly, in the case where there is no sidewalk and there is no step between a road surface and the outside of the road, the false recognition is likely to occur. In the present embodiment, if a road edge has failed to be recognized on the side of the road shape line CL where there is no adjacent lane to the own lane, an attempt is made again to recognize a road edge, which can increase the probability of being able to accurately recognize a road edge as needed.

In the present embodiment, the search ranges S1, S2 are set outside of an area between the demarcation lines L1, L2 of the own lane, respectively. If there is a tire mark on the demarcation line itself or if the demarcation line is blurred, the demarcation line itself may become a disturbance factor which may increase the likelihood of false recognition of road edges. Search over only the outside of the area between the demarcation lines L1, L2 may reduce the probability of false recognition of road edges.

In the present embodiment, if the own vehicle M is about to cross a road edge, the alert device 46 is controlled to output an audible alarm or a visual alert indication. If a road edge fails to be accurately recognized upon performing such control, this alert will be output despite the own vehicle not being actually crossing the edge. Thus, in the present embodiment, road edge recognition using search ranges S1, S2 narrowed to inhibit false recognition can prevent generation of unnecessary alerts.

Modifications

It is to be understood that the invention is not to be limited to the specific embodiment disclosed above and that modifications and other embodiments are intended to be included within the scope of the appended claims. These are applicable singly or in any combination with the specific embodiment disclosed above.

(M1) In the embodiment set forth above, the vehicle location P and the location of the imager 42 correspond in the road width direction. In an alternative embodiment, the vehicle location P and the location of the imager 42 may not correspond in the road width direction. In such an embodiment, the offset A that is a distance between the vehicle location P of the own vehicle M and the road shape line CL may be converted to an offset that is a distance between the location of the imager and the road shape line CL.

(M2) In the embodiment set forth above, a location of the own vehicle M in the road width direction is detected as a vehicle location P. The search ranges S1, S2 are set based on the detected vehicle location P. In an alternative embodiment, the full range in the captures image minus a range predetermined depending on a road width and centered at a center position of the captured image may be set as a search range.

(M3) In the embodiment set forth above, a reference location from which the offset is calculated is set to a location of the road shape line CL. In an alternative embodiment, another reference location may be used. For example, the reference location may be set to a location of a structural object or painting recognized in the captured image.

(M4) In the embodiment set forth above, the road shape line CL connecting a plurality of coordinate points C applied along the road is generated as a reference location. In an alternative embodiment, if the attribute information includes linear coordinate data, the linear coordinate data may be set as a reference location.

(M5) In the embodiment set forth above, a road edge as a road border, that is, a border location B1 between the road and the outside of the road or a border location B2 between the central reservation and the roadway, is recognized. In an alternative embodiment, demarcation lines of the own lane may be recognized. In another alternative embodiment, a demarcation line may be recognized on the left/right side of the own lane and a road edge may be recognized on the right/left side of the own lane. For example, a demarcation line may be recognized on the on-coming traffic side of the own lane (e.g., on the right side of the own lane in the case of the left-hand traffic) and a road edge may be recognized on the opposite side of the own lane. That is, a road border, which is either of a road edge and a demarcation line, may be recognized on each side of the own lane. In another alternative embodiment, both a demarcation line of the own lane and a road edge may be recognized on each of the left and right sides of the own lane.

(M6) In the embodiment set forth above, road edges include the border location B1 between the road and the outside of the road, the border location between the sidewalk and the roadway, and the border location B2 between the central reservation and the roadway. In an alternative embodiment, the road edges may include other types of road borders, such as a border location between the sidewalk and the outside of the road, and a border location between the road and a U-shaped groove, a curb, grass. In addition, a structural object, such as a guardrail or the like, provided near a road edge may be recognized.

(M7) In the embodiment set forth above, the own lane, that is, a lane in which the own vehicle is traveling, is recognized based on the offset A. In an alternative embodiment, the own lane may be recognized based on the image captured by the imager.

(M8) In the embodiment set forth above, the search ranges S1, S2 are set outside the demarcation lines L1, L2, respectively. In an alternative embodiment, the search ranges S1, S2 may be widened. More specifically, to recognize demarcation lines, the search ranges S1, S2 may be set to the entire area minus an inside area between estimated locations of the demarcation lines. The inside area between estimated locations of the demarcation lines is an area closer to the own vehicle than the estimated location of the left demarcation line L1 on the left side of the own vehicle and closer to the own vehicle than the estimated location of the right demarcation line L2 on the right side of the own vehicle. Each of the search ranges S1, S2 may include a respective one of the demarcation lines and an area outside the respective one of the demarcation lines. In the example of FIG. 3, the search range S2 on the right side of the own vehicle M may be set such that $S2 \leq -W1 \times N/2 - A + W2/2$, that is, the right search range S2 may be set to a range of distance equal to or less than a distance from the vehicle location P to the inner edge of the right demarcation line L2 in the road width direction, which is given by $-1$ times the width W1 times the number of lanes N over two minus the offset A plus the width W2 of one demarcation line over two. With this configuration, setting the search ranges S1, S2 not including the area inside the demarcation lines L1, L2 can prevent branches, tire marks and the like inside the demarcation lines L1, L2 from being recognized, thereby reducing the probability of false recognition.

(M9) In the embodiment set forth above, at steps S18 to S21, if a road edge fails to be recognized on the side of the road shape line CL where there is no adjacent lane to the own lane, an attempt is made again to recognize a road edge. In an alternative embodiment, whether or not a road edge fails to be recognized on the side of the road of the road shape line CL where there is no adjacent lane to the own lane, an attempt may be made again to recognize a road edge. In another alternative embodiment, even if a road edge fails to be recognized on the side of the road shape line CL where there is no adjacent lane to the own lane, an alert may be output to notify the driver of the own vehicle that no road border has been recognized, without making an attempt again to recognize a road edge, or a determination may not be made as to whether or not the own vehicle is about to cross a road border.

(M10) In the embodiment set forth above, at step S21 of FIG. 2, the same search range as used at step S17 is also used to perform edge recognition. In an alternative embodiment, at step S21 of FIG. 2, a search range wider than the search range used at step S17 may be used to perform edge recognition. For example, an outside area of the demarcation line, that is, an area further away from the own vehicle than the the demarcation line, may be used as the search range at step S17 of FIG. 2, and if a road edge fails to be recognized, then a wider area including the demarcation line may be used as the search range to perform edge recognition again.

(M11) In the embodiment set forth above, each search range is uniquely determined for the values of the offset A, the number of lanes N, the width W1 of each lane, the width W2 of the demarcation lines L1, L2, L3, according to a predefined calculating formula. In an alternative embodiment, the vehicle control apparatus, for example, the search range setter 13, may be configured to determine the reliability of the vehicle location P and variably set each search range with the reliability of the vehicle location P. Depending on a receiving condition of the sensor related to the location of the own vehicle, it may be determined that the reliability of the vehicle location P is low. For example, buildings or mountains may impede reception of location information from the satellite positioning system, which may decrease the reliability of the detected location. In such a low reliability situation, the search ranges may be widened as compared to when the reliability of the vehicle location is high. For example, it may be assumed that each search range for high reliability of the vehicle location is set outside the demarcation line when recognizing a road edge. The search ranges may be widened if it is determined that the reliability of the vehicle location is low such that each search range extends outward from inside the demarcation line. Each search range is widened when the reliability of the vehicle location is low as compared to when the reliability of the vehicle location is high. This can prevent deviation of a road edge out of the search range, thereby enabling reliable recognition of the road edge.

(M12) In the embodiment set forth above, each search range is uniquely determined for the values of the offset A, the number of lanes N, the width W1 of each lane, the width W2 of the demarcation lines L1, L2, L3, according to a predefined calculating formula. In an alternative embodiment, the vehicle control apparatus, for example, the search range setter 13, may be configured to variably set each search range with the vehicle speed of the own vehicle. It is more needed to reliably recognize a road border when the own vehicle is traveling at a high vehicle speed than when the own vehicle is traveling at a low vehicle speed. Therefore, each search range may be widened with increasing vehicle speed of the own vehicle. This can prevent deviation of a road edge out of the search range, thereby enabling reliable recognition of the road edge.

(M13) In the embodiment set forth above, the inhibitor 16 is configured to control the alert device 46 to output an audible alarm or a visual alert indication. In an alternative embodiment, the inhibitor 16 may be configured to control driving of the own vehicle to inhibit the own vehicle from crossing a border, for example, by adjusting the steering angle or by the braking the own vehicle prior to crossing the border.

(M14) In the embodiment set forth above, border recognition is always performed. In an alternative embodiment, the border recognition may be performed depending on whether or not a recognition instruction switch installed in the own vehicle is on or off.

What is claimed is:

1. A vehicle control apparatus mounted in a vehicle equipped with an imager to capture an image of surroundings of the vehicle, the apparatus being configured to perform driving aid control using map information stored in a storage, the map information including attribute information concerning roads on which the vehicle carrying the apparatus may travel and widths of the respective roads, the vehicle carrying the apparatus being referred to as an own vehicle, the apparatus comprising:
    a road recognizer configured to recognize a travelled road that is a road on which the own vehicle is traveling;
    an information acquirer configured to acquire the attribute information of the travelled road;
    an image acquirer configured to acquire an image captured by the imager;
    a search range setter configured to, using the attribute information acquired by the information acquirer, set a search range in the captured image for searching for a road border that is an edge or a demarcation line of the travelled road; and
    a border recognizer configured to recognize the road border in the search range.

2. The apparatus according to claim 1, wherein
    the road recognizer is configured to acquire a location of the own vehicle as a vehicle location from a location detector configured to detect the vehicle location, and
    the search range setter is configured to calculate an offset that is a distance between a reference location and the vehicle location in a road-width direction, and set the search range using the calculated offset.

3. The apparatus according to claim 2, wherein
    the attribute information includes coordinate data applied along the travelled road, and
    the search range setter is configured to calculate the offset using the reference location defined by the coordinate data.

4. The apparatus according to claim 2, wherein the location detector is configured to detect the vehicle location of the own vehicle with satellite navigation and autonomous navigation.

5. The apparatus according to claim 2, wherein the search range setter is configured to determine the reliability of the vehicle location detected by the location detector, and widen the search range when the reliability is low as compared to when the reliability is high.

6. The apparatus according to claim 1, wherein
    the attribute information includes lane information of the travelled road, and
    the border recognizer is configured to, based on the lane information, determine whether or not there is an adjacent lane to an own lane that is a lane in which the own vehicle is traveling, and if there is no adjacent lane to the own lane on at least one of left and right sides of the own lane, recognize a road edge as the road border, on the at least one of left and right sides of the own lane where there is no adjacent lane to the own lane.

7. The apparatus according to claim 6, wherein the lane information of the travelled road includes a number of lanes of the travelled road.

8. The apparatus according to claim 6, wherein the lane information of the travelled road includes a width of each lane of the travelled road.

9. The apparatus according to claim 1, wherein the search range setter is configured to estimate a location of the demarcation line of an own lane that is a lane in which the own vehicle is traveling based on the attribute information, and set the search range to a full range minus an area closer to the own vehicle than the demarcation line of the own lane.

10. The apparatus according to claim 9, wherein the search range setter is configured to set the search range to be outside of the demarcation line of the own lane.

11. The apparatus according to claim 1, wherein the search range setter is configured to widen the search range when the own vehicle is traveling at a high speed as compared to when the own vehicle is traveling at a low speed.

12. The apparatus according to claim 1, further comprising an inhibitor configured to estimate a predicted route forward of the own vehicle, and if the own vehicle is about to cross the road border when traveling along the predicted route, inhibit the own vehicle from crossing the road border.

* * * * *